US007530896B2

(12) United States Patent
Gauselmann

(10) Patent No.: US 7,530,896 B2
(45) Date of Patent: May 12, 2009

(54) GAMING DEVICE GIVES PLAYER AWARD WHEN JACKPOT MEETS A TRIGGER THRESHOLD

(75) Inventor: Michael Gauselmann, Espelkamp (DE)

(73) Assignee: Atronic International GmbH, Lübbecke (DE)

( * ) Notice: Subject to any disclaimer, the term of this patent is extended or adjusted under 35 U.S.C. 154(b) by 648 days.

(21) Appl. No.: 11/001,898

(22) Filed: Dec. 1, 2004

(65) Prior Publication Data

US 2006/0116201 A1 Jun. 1, 2006

(51) Int. Cl.
*A63F 13/00* (2006.01)

(52) U.S. Cl. .............................. 463/27; 463/26; 463/28

(58) Field of Classification Search .............. 463/26–28
See application file for complete search history.

(56) References Cited

U.S. PATENT DOCUMENTS 5,564,700 A * 10/1996 Celona ........................ 463/27
5,766,076 A * 6/1998 Pease et al. .................... 463/27
5,984,779 A * 11/1999 Bridgeman et al. ........... 463/16
6,089,980 A * 7/2000 Gauselmann ................ 463/27
6,110,043 A * 8/2000 Olsen .......................... 463/27
6,168,523 B1 * 1/2001 Piechowiak et al. ........... 463/26
6,358,149 B1 * 3/2002 Schneider et al. ............. 463/27
6,416,409 B1 * 7/2002 Jordan ......................... 463/27
7,172,506 B2 * 2/2007 Baerlocher et al. ............ 463/25
2001/0004607 A1 * 6/2001 Olsen .......................... 463/26

* cited by examiner

*Primary Examiner*—John M Hotaling, II
*Assistant Examiner*—Peter R Egloff
(74) *Attorney, Agent, or Firm*—Patent Law Group LLP; Brian D. Ogonowsky

(57) ABSTRACT

A group of linked gaming machines generates one or more progressive jackpots, common to all the linked machines, where the amount of each jackpot is increased by a percentage of the wagers made by the players. In accordance with the invention, in order to provide incentive for the player to keep playing the machines and to add additional excitement, non-jackpot awards are paid out to players of the linked gaming machines based on triggering thresholds met by each jackpot. One type of triggering threshold may be a threshold value reached by a jackpot. Upon a jackpot reaching the threshold, one or more players will win an award. After an award win, another threshold level will then be set for the jackpot. Since the frequency of the awards being granted is generally higher than the frequency of the full jackpots being won, the players will anticipate awards being granted and will continue to play the machines. The linked gaming machines can be provided with the additional game with little or no changes to the game programs in the gaming machines, since only the existing jackpot meters are used in the game. The game may be carried out by a central processor or a master processor used for administering the jackpot.

24 Claims, 4 Drawing Sheets

GAMING DEVICE GIVES PLAYER AWARD WHEN JACKPOT MEETS A TRIGGER THRESHOLD

FIELD OF THE INVENTION

This invention relates to gaming devices and, in particular, to a progressive jackpot technique for a gaming device.

BACKGROUND

Gaming machines are sometimes referred to as slot machines. In a typical progressive jackpot gaming machine, a progressive jackpot is accumulated by allocating a percentage of every wager to the jackpot. In a typical example, the jackpot is won by video or mechanical reels displaying a special combination of symbols. Typically, a number of gaming machines are linked and share the same jackpot, so the jackpot usually becomes very large.

Since the winning of the jackpot is very infrequent, the players are not particularly motivated to keep playing the machines.

What is needed is a gaming device that gives the player added incentive to keep playing the device.

SUMMARY

A group of linked gaming machines generates one or more progressive jackpots, common to all the linked machines, where the amount of each jackpot is increased by a percentage of the wagers made by the players. A progressive jackpot is awarded to a player when a special outcome of the player's machine occurs. Such a special outcome is typically a special combination of symbols across one or more activated paylines. If there are multiple jackpots, each jackpot may be associated with a different winning outcome. The awarding of the jackpots is typically infrequent in order to keep the amounts of the jackpots relatively high.

In accordance with the invention, in order to provide incentive for the player to keep playing the machines, non-jackpot awards are paid out to players of the linked gaming machines based on triggering thresholds met by each jackpot. One type of triggering threshold may be a threshold value reached by a jackpot. Upon a jackpot reaching the threshold, one or more players will win an award. After an award win, another threshold level will then be set for the jackpot. The awards are less than the full jackpot amounts so may be granted more frequently than the jackpots.

As the jackpots increase, the players will realize that it is becoming more and more likely that an award will be granted to one or more of the players due to the jackpots exceeding their trigger threshold values. Hence, the players will continue to play the machines.

In other embodiments, the sub-jackpot awards are based on trigger events other than a threshold value.

Additionally, the winning of awards based on the jackpots acts as an additional game, adding further excitement. The players will pay attention to the jackpot meters to anticipate when a next trigger or level is reached. When an award is won, the win may be celebrated by sounds, lights, and graphics on an overhead display and on the winning machine, informing all players of the linked machines that the award for the current level has been won by a player. Such an audio and visual display will entice additional players to play the linked machines.

Various embodiments of this general concept are described to heighten the level of excitement and anticipation by the players. The granting of awards based upon triggering thresholds met by the jackpots essentially creates an additional game that is continually played as the players play the main game on the gaming devices.

DETAILED DESCRIPTION

Figure 1:
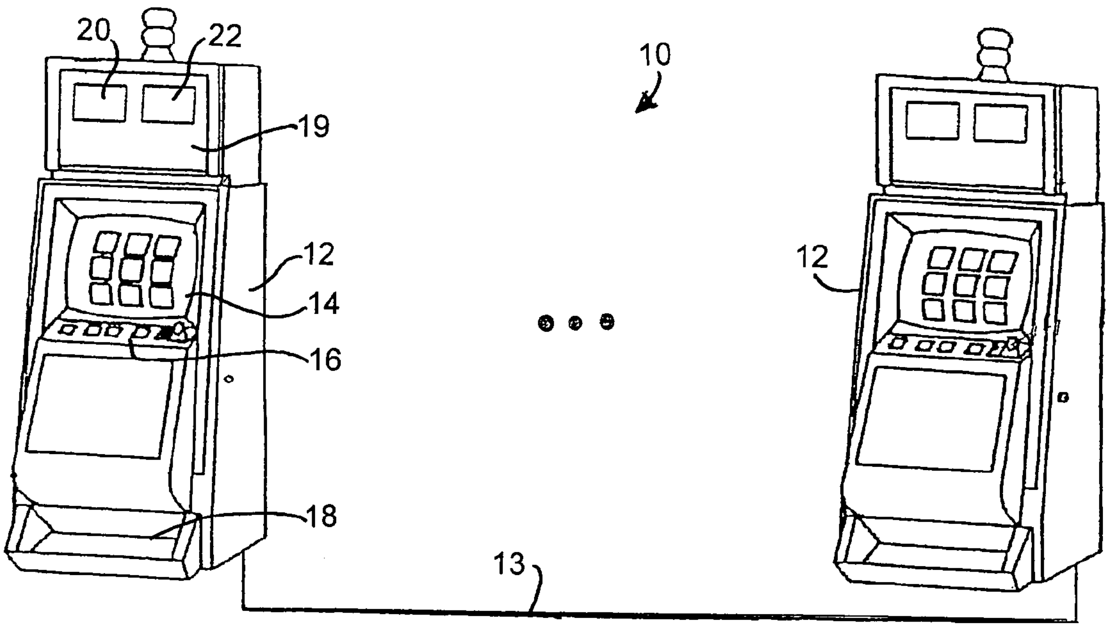
FIG. 1 illustrates linked gaming machines where a percentage of the wagers are allocated to one or more jackpot amounts displayed on a jackpot meter.

FIG. 1 illustrates a linked gaming machine system 10 comprising a plurality of gaming machines 12 that communicate with each other or with a central server using a communications link 13. A central server is not needed if one of the machines 12 acts as a master controller. A communications link is needed so that a percentage of the bets made on each of the gaming machines is allocated to one or more jackpots common to all the linked gaming machines 12.

Each machine 12 has a main display 14. This display 14 may be a video screen displaying the rotation and stopping of virtual reels, or display 14 may be windows revealing physical motor-driven reels. In such games, awards are based on the combinations of symbols across activated paylines.

Control buttons 16 are provided so that the player may make selections such as placing a bet, placing a maximum bet, spin reels, cash out, and any other function. Buttons 16 may be replaced by or augmented with touch screen virtual buttons on display 14.

A coin tray 18 receives coins or tokens upon a win or upon the player cashing out. Payouts may also be made by printing tickets, electronically altering a card, electronically altering a central memory, or other known means.

Various means for receiving money or monetary equivalents may be incorporated in machines 12, such as coin and bill slots, card readers, and printed ticket readers.

An upper display portion 19 includes progressive jackpot meters 20 and 22. Each jackpot amount is displayed by an associated meter. Meters 20 and 22 may be any type of display, such as a seven-segment LED display, an LCD, etc. In one embodiment, upper display 19 is an active display, such as an LCD or CRT, and meters 20 and 22 are video windows displaying the jackpot amounts. Instead of meters 20 and 22 on each machine, a large common display may be provided to advertise the jackpot amounts to all the players.

Upper display portion 19 or any other meter on machines 12 identifies the number of accumulated credits.

The number of progressive jackpots may range from one to any number. Typically, each jackpot is won by an associated special outcome of the main game played on display 14. Between the times that the jackpots are awarded, the players win regular awards during the main game by obtaining, for example, winning symbol combinations across paylines.

Typically, the larger jackpots are won by an outcome that occurs less frequently than the outcomes for winning the smaller jackpots. By providing a variety of jackpots, there is a higher likelihood that any player may win one of the jackpots, and this maintains a higher level of excitement by the players. The present invention, described below, is also applicable to a single progressive jackpot.

A processor in a central server or in a master controller machine detects the wagers made in the various linked machines and allocates predetermined percentages of the wagers to the various jackpots so that the jackpots continually increase until they are won by a player. The jackpot pool then starts again from an initial amount.

Hidden pools may also be accumulated from a percentage of the wagers for starting a visible jackpot at a non-zero amount or for funding the sub-jackpot awards discussed below. Alternatively, the sub-jackpot awards may be funded by the visible jackpots themselves, and thus the appropriate visible jackpot would be diminished if a sub-jackpot award were funded by the visible jackpot. The concepts described herein can be applied to both situations.

A master controller or a central processor external to all the linked machines may control the awarding of a jackpot by designating one of the machines at a certain time to generate a jackpot-winning outcome, such as a special combination of symbols. In this way, administering of the jackpot may be better controlled.

In addition to a player winning regular awards during the main game and winning conventional jackpots by obtaining special symbol combinations, another method for providing awards for the player is provided by system 10. In one embodiment, as a jackpot increases in value, it exceeds a certain threshold, which may be randomly determined by system 10 or determined based on other criteria. When it is detected that a jackpot has exceeded this certain threshold, an award, which is less than the entire jackpot, is granted to one or more of the players. These sub-jackpot awards are typically granted at a frequency higher than the frequency of granting the full jackpots, and the increased frequency of winning generates additional excitement in the player. The sub-jackpot award may be funded by one or more hidden pools or by the visible jackpot(s).

In one embodiment, a player is eligible for winning a sub-jackpot award simply by playing a participating machine. In other embodiments, the player is only eligible for winning a sub-jackpot award if certain criteria are met. Examples of such criteria are: 1) the player is eligible only if the player is eligible to win the jackpot itself (e.g., some games require the player to make a max bet to qualify for the jackpot); or 2) the player is only eligible if she plays the max lines, or the max bet, or bets extra credits to qualify.

An award may be granted when the jackpot reaches certain known fixed threshold values. The award may be a fixed known amount for each threshold value. For example, the player gets a 1 credit award for the jackpot exceeding the threshold of 100; 10 credits for a threshold of 1000; 100 credits for a threshold of 10,000; etc. The award may be 10% of the threshold or another value. In another example, the threshold values are special numbers such as 33, 333, 555, 7777, etc. Certain countries treat certain numbers as special, and those numbers may be included as the threshold values. Reaching these thresholds may result in fixed awards like 10, 100, 1000, or a fixed percentage (e.g., 10%) of the threshold. In another embodiment, an award is granted for every 100th (e.g., 100, 200, etc.) or 1000th jackpot unit, or other milestone.

An award may be granted when the jackpot reaches a value unknown to the players, such as a random number selected by a pseudo-random number generator.

Any combination of the above award thresholds may be used.

The trigger threshold met by the jackpot may be other than exceeding a threshold value.

The sub-jackpot award itself may be variable and unknown to the players. In one example, the award is randomly determined, but within a range whose maximum is no greater than the jackpot. In another example, a variety of possible awards are predefined or drawn from a set of possible awards, and those possible awards are displayed to all the players well prior to the award being granted. In another example, the award to be paid to a player may be determined only after the player knows she has won an award. In that example, the award may be formed by a random combination of the threshold value digits. For example, the threshold value may by 5678, and the award may be selected based on a random combination of three of the digits (e.g., 687 credits). The award may even be based on the sum of all or a subset of the digits in the threshold value. In another example, the award is the outcome of a game, such as described below with reference to FIG. 3.

In another example, when a first threshold level is reached, a first award digit is stored for the winning player. When the second threshold is reached, a second digit is stored along with the first digit. When all or a predetermined number of thresholds have been reached, and corresponding digits have been stored, the player wins an award based on the stored digits. For example, the digits may be ordered sequentially or randomly to specify the award value. Such a technique keeps the player playing the machine.

The granting of awards based on the jackpot values keeps players playing the linked machines. Additionally, the winning of awards based on the jackpots acts as an additional game, adding further excitement. The players will pay attention to the jackpot meters 20, 22 (FIG. 1) to anticipate when a next trigger will be reached. Hence, an added game and added excitement can be provided with no additional bonus screens and without any time being used up by a bonus game. Such an additional game based on the jackpot amount can be added to any linked gaming system without changing the main game program for the linked machines since the additional game can be administered by a central processor or a master processor (in one of the linked machines) used for accumulating the jackpot and hidden pools, controlling one of the linked machines to generate a winning jackpot outcome at a certain time, and granting the awards based on the jackpot thresholds.

When an award is won based on the jackpot level, the win may be celebrated by sounds, lights, and graphics on an overhead display and on the winning machine, informing all players of the linked machines that the award for the current level has been won by a player. Such an audio and visual display will entice additional players to play the linked machines.

Figure 2:
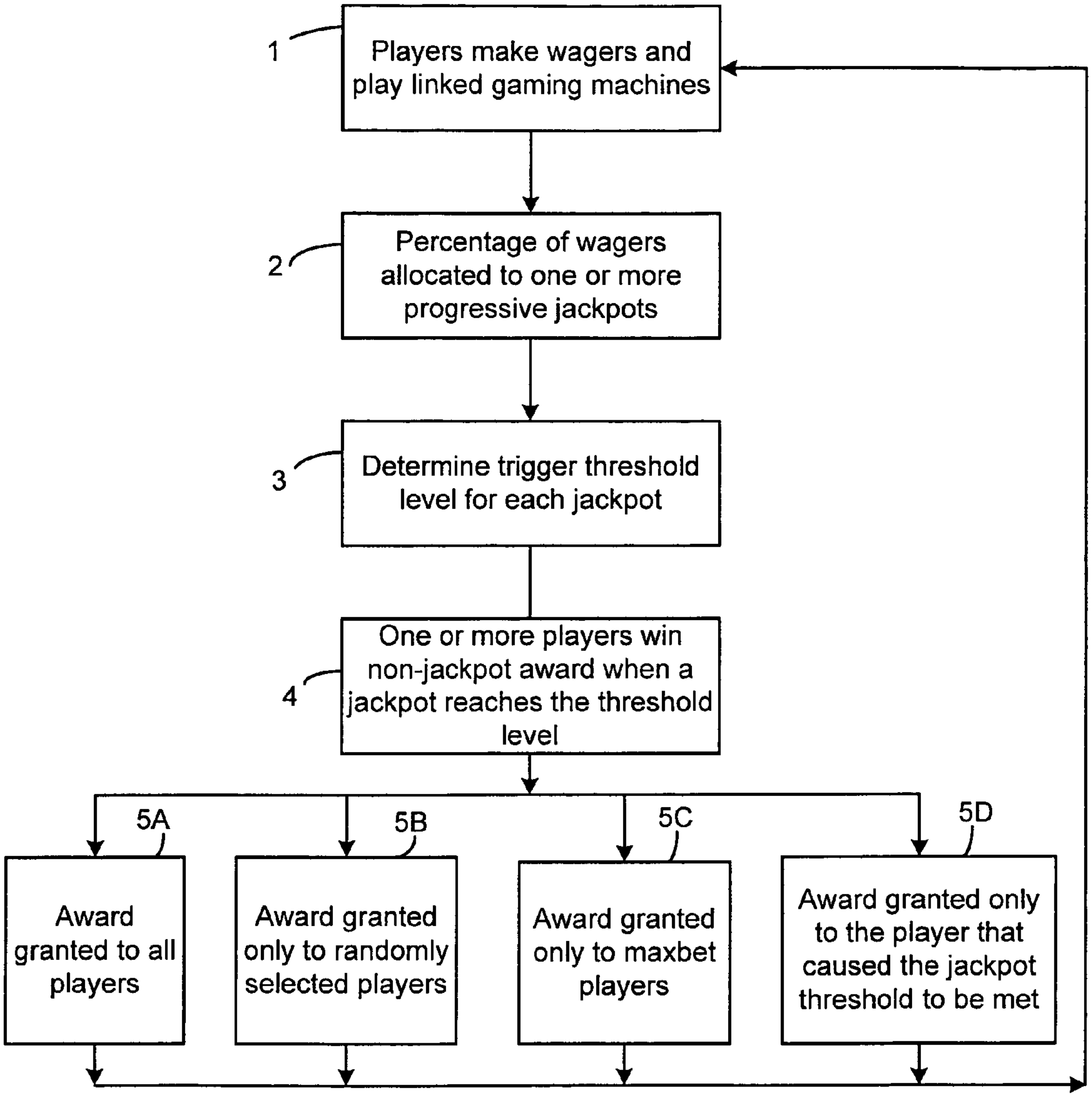
FIG. 2 is a flowchart of one embodiment of the inventive technique.

FIG. 2 is a flow chart that further explains the basic technique of granting a sub-jackpot award based on a jackpot threshold value.

In step 1 of FIG. 2, the players make wagers and play the linked gaming machines in a conventional manner. The game played may be the spinning of actual or virtual reels to obtain winning symbol combinations across paylines. The main game may be any other type of game. The players win regular awards based on the outcomes of the main game.

In step 2, a percentage of the wagers are allocated to one or more progressive jackpots. The current values of the jackpots are displayed in meters 20 and 22 in FIG. 1. Hidden pools may also be accumulated by a percentage of the wagers.

In step 3, a trigger threshold for each jackpot is determined. This trigger threshold may be a randomly selected value of the jackpot or may be a predetermined value (e.g., 100, 1,000, 10,000) as previously discussed. If the threshold is a random value, the random selection of a threshold value may occur in real-time as the jackpot is accumulating and need not be predetermined. Certain numbers may have a special meaning in a particular country or region. The trigger threshold may be the jackpot meter showing a special number such as 13, 21, 777, etc.

Alternatively, the trigger threshold met by the jackpot may be based on a time from the last jackpot award, based on the activity of the gaming machines, based on the time of day, or based on any other factor. Each jackpot may have its own trigger threshold.

As the wagers are made and the jackpots increase, the threshold determined in step 3 will eventually be met by a jackpot.

In step 4, upon the threshold of a jackpot being met, one or more players will win an award. This award may be a fixed award, a randomly determined award, or an award based upon other factors, as previously described. Typically, the award will be far less than the jackpot amount. The award may be paid from the jackpot, and thus get deducted from the jackpot, or the award may be paid separately from the jackpot, such as from a hidden pool.

The awards may be paid out by issuing credits to the player, which the player may then convert to tokens, cash, a ticket, a card record, or other means by cashing out of the machine.

Steps 5A-5D are various alternative techniques to determine which players win the award.

In step 5A, the award for a jackpot meeting the threshold is granted to all the active players of the machines 12. The award granted to the active players may be a predetermined award given to each of the players, or the award may be an amount that is divided by the number of players actively playing, or the award to each player may be based upon other criteria such as the amount of the last bet by a player, or the award may be based upon other criteria. For example, a player that has made a maximum bet at the time the award is granted will receive a larger award than a player who has made a lower bet at the time of the award. An active gaming machine may be determined by detecting accumulated credits in the machine or a play within a certain period, such as within the last 15 seconds.

Alternatively, as shown in step 5B, the award is granted only to randomly selected active gaming machines.

Alternatively, as shown in step 5C, the award is granted only to those players who have bet the maximum bet in a current game or the previous game.

Alternatively, as shown in step 5D, the award is granted only to the single player that caused the jackpot threshold to be exceeded by her wager.

Alternatively, the award may be granted to the first player who has achieved a winning outcome after the threshold has been reached. Other criteria have been previously described, and other criteria for granting the award to the players will be understood by those skilled in the art.

After the award is granted, normal play resumes, and another trigger threshold is determined as the jackpot reaches higher levels. The method of FIG. 2 may apply to each of the jackpots separately.

Figure 3A:
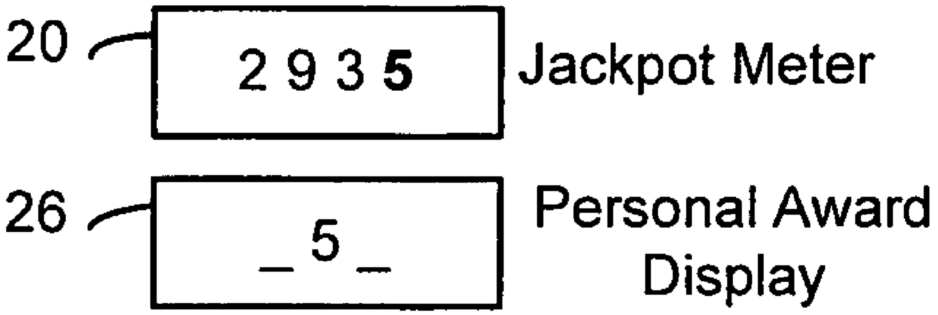
FIGS. 3A, 3B, and 3C illustrate a game that is played by a player once it is determined that the player is to win an award due to a jackpot meeting a certain threshold.
Figure 3B:
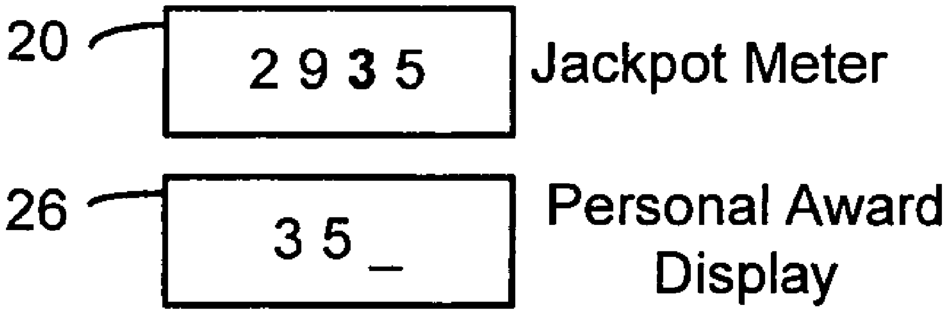
Figure 3C:
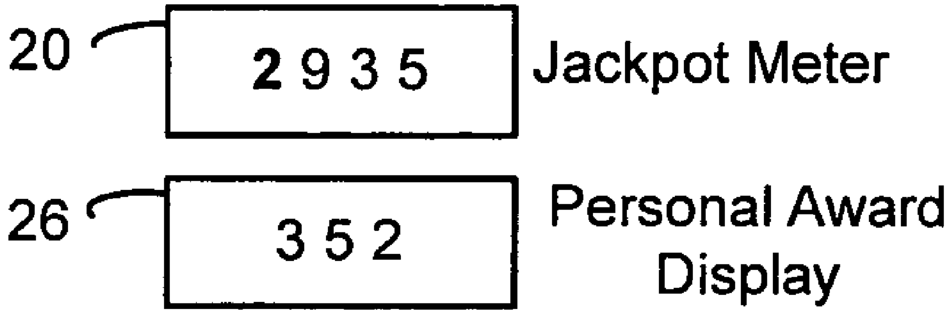

The granting of an award to one or more of the players in step 5 of FIG. 2 may even entail an additional game. FIGS. 3A-3C illustrate one type of game that may be played so that the award is based on the outcome of an additional game.

In FIG. 3A, it is assumed the jackpot meter 20 displays a progressive jackpot value of 2935. It is assumed that in step 3 of FIG. 2, that this value of 2935 meets the threshold criteria for awarding one or more of the players an award. The selection of the players to play the additional game may be based on any of the criteria in step 5 of FIG. 2. In FIG. 3A, the processor in the gaming machine or a special jackpot processor randomly selects one of the numerals in the jackpot value of 2935. It is understood that, in the context of gaming machines, the word "random" applies to both purely random events and pseudo-random events. In the example shown, the computer has selected numeral 5, which is in bold type. The player then selects a position for this selected numeral 5 in a personal award display 26 on the gaming machine 12. In this example, the player places the numeral 5 in the second one of three positions. The number of positions may be any number, such as two or more, and may depend upon the level of the jackpot.

In FIG. 3B, the computer has randomly selected the numeral 3, and the player places the numeral 3 in the first position in the player's personal award display 26, wanting to assure that the award will be at least 352.

In FIG. 3C, the computer has randomly selected the numeral 2, which is placed in the last position in the personal award display 26. This awards the player 352 credits (or dollars, etc.) In another embodiment, the computer randomly places the number selected from the jackpot meter 20 in the personal award display 26.

FIGS. 3A-3C illustrate only one type of additional game that may be played to add further excitement in the granting of an award to a player based upon the jackpots meeting certain trigger thresholds.

In another embodiment, once a first threshold level is reached, a first numeral is selected and positioned, similar to that shown in FIG. 3A. Upon a second threshold level being reached, a second numeral from the jackpot meter is selected and positioned. The process continues for various threshold levels. By the player building an award over time, the player is motivated to keep playing the game until she receives the special award after the final threshold is achieved.

In another embodiment, the awards granted to a player upon the jackpots meeting certain trigger thresholds may fill up personal jackpot pools that the player may win upon any other type of trigger event, such as the player obtaining certain symbol combinations or any other type of event.

Figure 4:
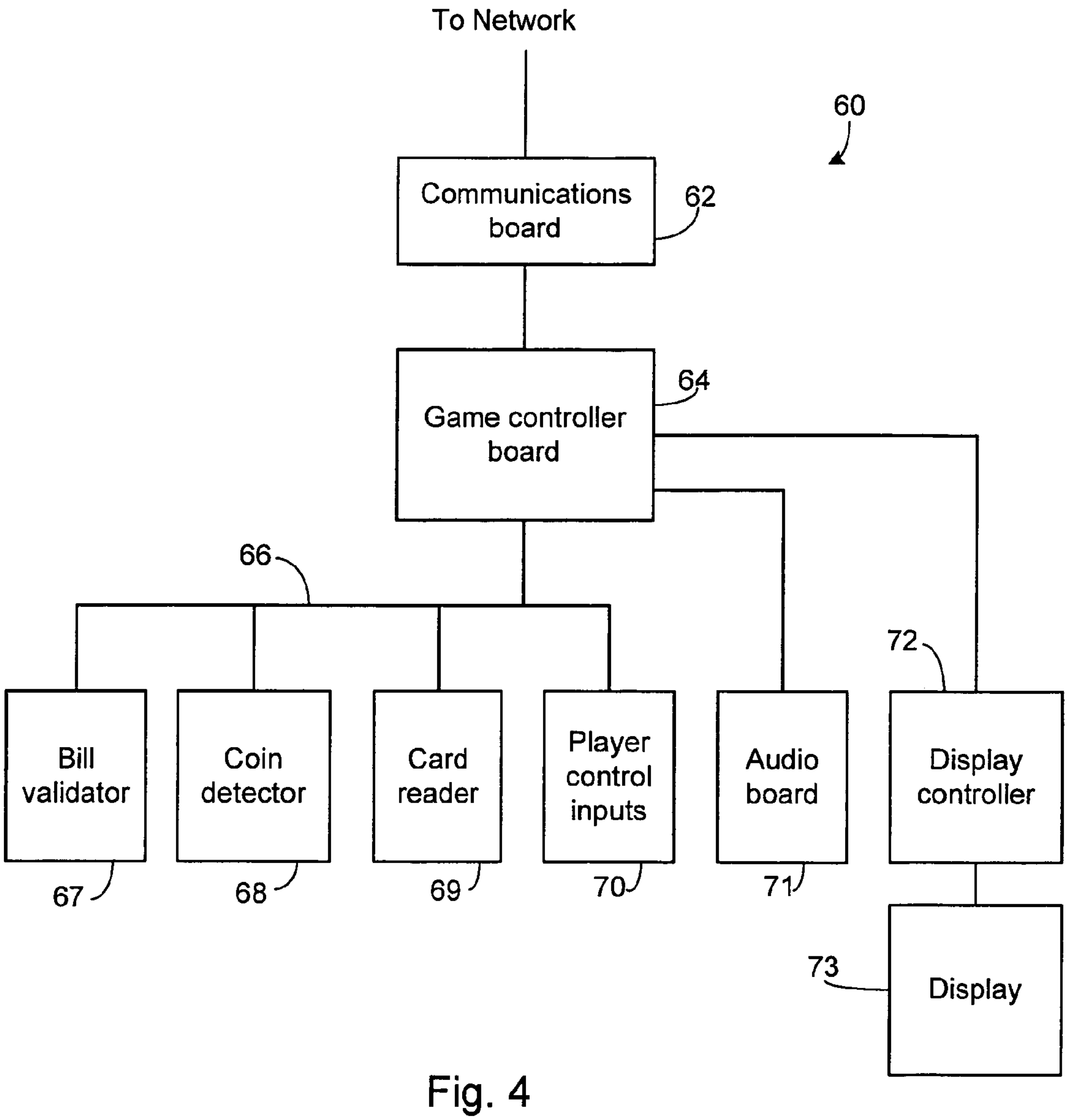
FIG. 4 illustrates certain functional units in each of the gaming devices of FIG. 1.

FIG. 4 is a block diagram of one type of gaming machine 60 that may be linked to other gaming machines and may include software to carry out the present invention. The gaming machine 60 may use conventional hardware.

A communications board 62 may contain conventional circuitry for coupling the gaming machine 60 to a local area network (LAN) or other type of network using Ethernet or any other protocol. The communications board 62 transmits using a wireless transmitter, or it may be directly connected to a network running throughout the casino floor. The communications board 62 basically sets up a communication link with a master controller or server and buffers data between the network and the game controller board 64. The communications board 62 may also communicate with a network server for purposes other than to carry out the present invention.

The game controller board 64 contains memory and a processor for carrying out programs stored in the memory and for providing the information requested by the network. The game controller board 64 primarily carries out the game routines. If one of the gaming machines acts like a master controller for the progressive jackpot invention, software in the memory controls the game controller board 64 or another processor to carry out the steps in FIG. 2.

Peripheral devices/boards communicate with the game controller board 64 via a bus 66 using, for example, an RS-232 interface. Such peripherals may include a bill validator 67, a coin detector 68, a smart card reader or other type of credit card reader 69, and player control inputs 70 (such as buttons or a touch screen). An audio board 71 converts coded signals into analog signals for driving speakers. A display controller 72 converts coded signals to pixel signals for the display 73. Display controller 72 and audio board 71 may be directly connected to parallel ports on the game controller board 64.

The electronics on the various boards may be combined onto a single board.

Having described the invention in detail, those skilled in the art will appreciate that, given the present disclosure, modifications may be made to the invention without departing from the spirit of the inventive concepts described herein. Therefore, it is not intended that the scope of the invention be limited to the specific embodiments illustrated and described.

What is claimed is:

1. A gaming method comprising:

a. detecting wagers from a plurality of linked gaming machines, the wagers being bet by players for playing a main game;

b. generating one or more progressive jackpots from the wagers, the one or more progressive jackpots including a first progressive jackpot;

c. displaying the first progressive jackpot to players of the gaming machines;

d. determining when the first progressive jackpot has met a first award trigger threshold, the first award trigger threshold being a current award trigger threshold before being superseded by a next award trigger threshold;

e. determining an award to be paid to one or more players of the gaming machines for the first progressive jackpot meeting the current award trigger threshold, the award being less than the first progressive jackpot value, the current award trigger threshold being based on other than particular outcomes of the main game;

f. selecting one or more players to win the award determined in step e irrespective of any outcomes of the main game;

g. granting the award determined in step e to the one or more players selected to win the award irrespective of any outcomes of the main game, the award being deducted from one of the one or more progressive jackpots;

h. selecting the next award trigger threshold to supersede the current award trigger threshold met by the first progressive jackpot until the first progressive jackpot is won, the next award trigger threshold being always higher than the current award trigger threshold; and i. repeating steps e through h until the first progressive jackpot is won.

2. The method of claim 1 wherein step f comprises selecting all players of the gaming machines to win the award determined in step e.

3. The method of claim 1 wherein step f comprises randomly selecting players of the gaming machines to win the award determined in step e.

4. The method of claim 1 wherein step f comprises selecting only those players who have placed a maximum wager to win the award determined in step e.

5. The method of claim 1 wherein step f comprises selecting only the player of the gaming machines whose wager caused the first progressive jackpot to meet the trigger threshold to win the award determined in step e.

6. The method of claim 1 wherein step d comprises randomly generating a threshold value and determining when the first progressive jackpot value has met the threshold value.

7. The method of claim 1 wherein step d comprises determining when the first progressive jackpot value has met a predetermined threshold value.

8. The method of claim 1 wherein step g comprises deducting the award from the first progressive jackpot.

9. The method of claim 1 wherein the one or more progressive jackpots includes a hidden pool, and wherein step g comprises deducting the award from the hidden pool.

10. The method of claim 1 wherein the one or more progressive jackpots comprise a plurality of progressive jackpots.

11. The method of claim 1 wherein the one or more progressive jackpots comprise a plurality of progressive jackpots, each progressive jackpot having an associated trigger threshold value.

12. The method of claim 1 wherein step e comprises one or more players playing a game for determining the award.

13. The method of claim 12 wherein the game for determining the award comprises:

randomly selecting a numeral in a current first progressive jackpot value;

placing the selected numeral in a first position in a display;

selecting one or more additional numerals in the first progressive jackpot value;

positioning the one or more additional numerals in one or more positions in the display to form an arrangement of numerals; and determining the award to be paid to the one or more players in step e based upon the arrangement of numerals in the display.

14. The method of claim 13 wherein the numerals selected from the first progressive jackpot value are randomly arranged in the display.

15. The method of claim 13 wherein the numerals selected from the first progressive jackpot value are arranged by a player in the display.

16. The method of claim 12 wherein the game for determining the award comprises:

selecting a numeral in a current first progressive jackpot value;

placing the selected numeral in a first position in a display;

selecting one or more additional numerals in future first progressive jackpot values;

positioning the one or more additional numerals in one or more positions in the display to form an arrangement of numerals; and determining the award to be paid to the one or more players in step e based upon the arrangement of numerals in the display.

17. The method of claim 1 wherein step e comprises determining the award based on a value of the first award trigger threshold.

18. The method of claim 17 wherein step e comprises determining the award by selecting one or more digits of the first award trigger threshold as the award.

19. The method of claim 18 wherein step e comprises determining the award by randomly arranging selected digits in the first award trigger threshold.

20. The method of claim 17 wherein determining the award comprises awarding a predetermined percentage of the first award trigger threshold.

21. The method of claim 17 wherein step e comprises randomly determining the award amount.

22. The method of claim 17 wherein step e comprises selecting the award from a group of possible awards.

23. The method of claim 1 wherein the current award trigger threshold is made known to the players.

24. The method of claim 1 wherein the current award trigger threshold is not made known to the players.

* * * * *